Dec. 20, 1960     A. W. HOLLAR, JR     2,965,402
REMOTE LOCKING BUTTON DEVICES
Filed May 12, 1958     4 Sheets-Sheet 1
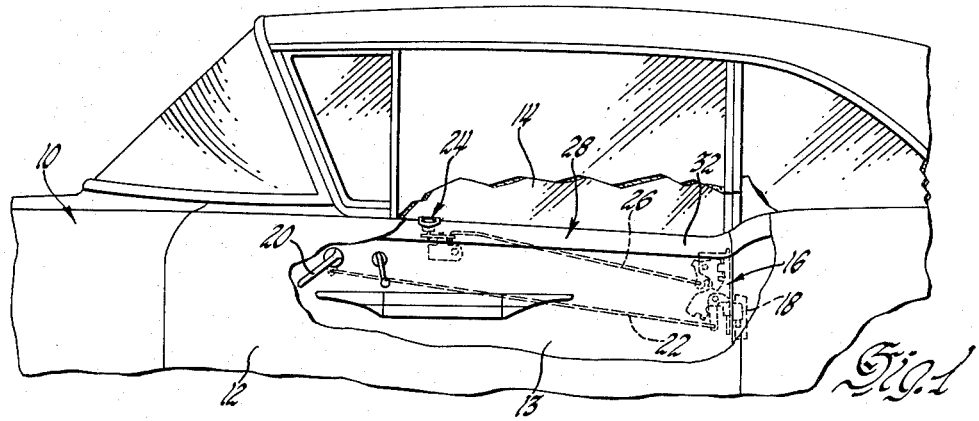
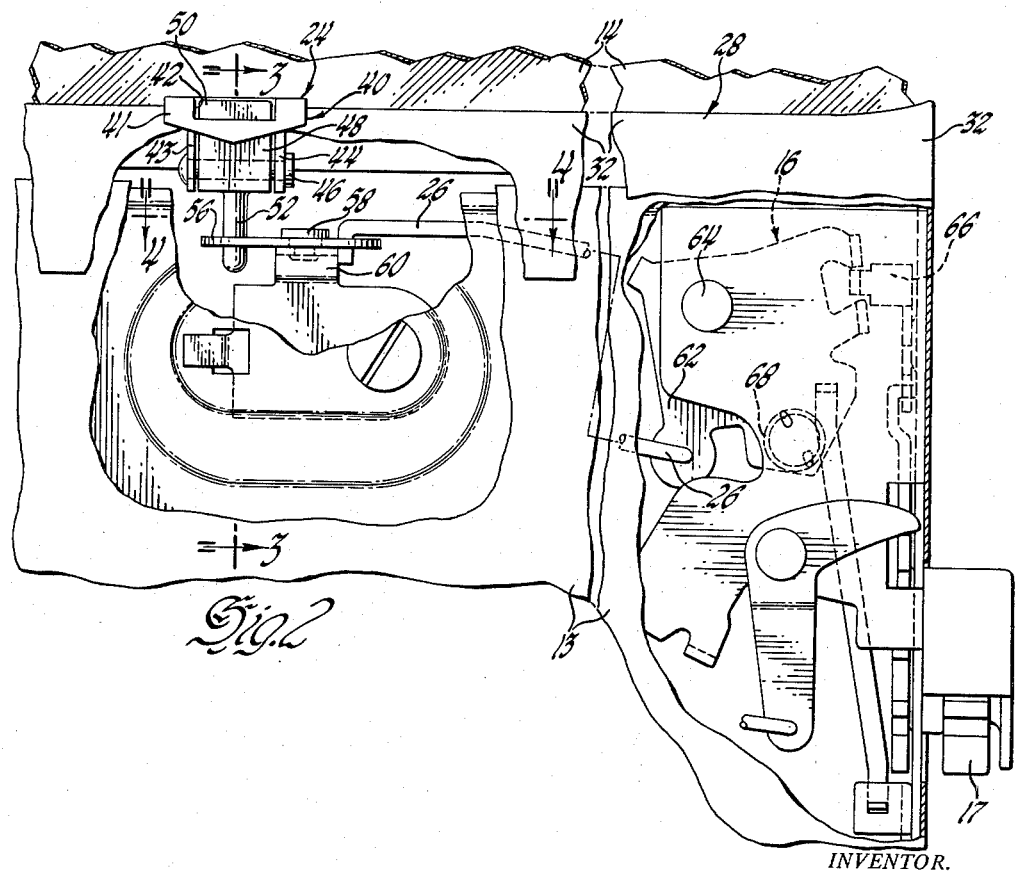
INVENTOR.
Arthur W. Hollar, Jr.
BY
W. S. Pettigrew
ATTORNEY Dec. 20, 1960

A. W. HOLLAR, JR 2,965,402

REMOTE LOCKING BUTTON DEVICES

Filed May 12, 1958

INVENTOR.
Arthur W. Hollar, Jr.
BY
W. S. Pettigrew
ATTORNEY

INVENTOR.
BY Arthur W. Hollar, Jr.
W. S. Pettigrew
ATTORNEY

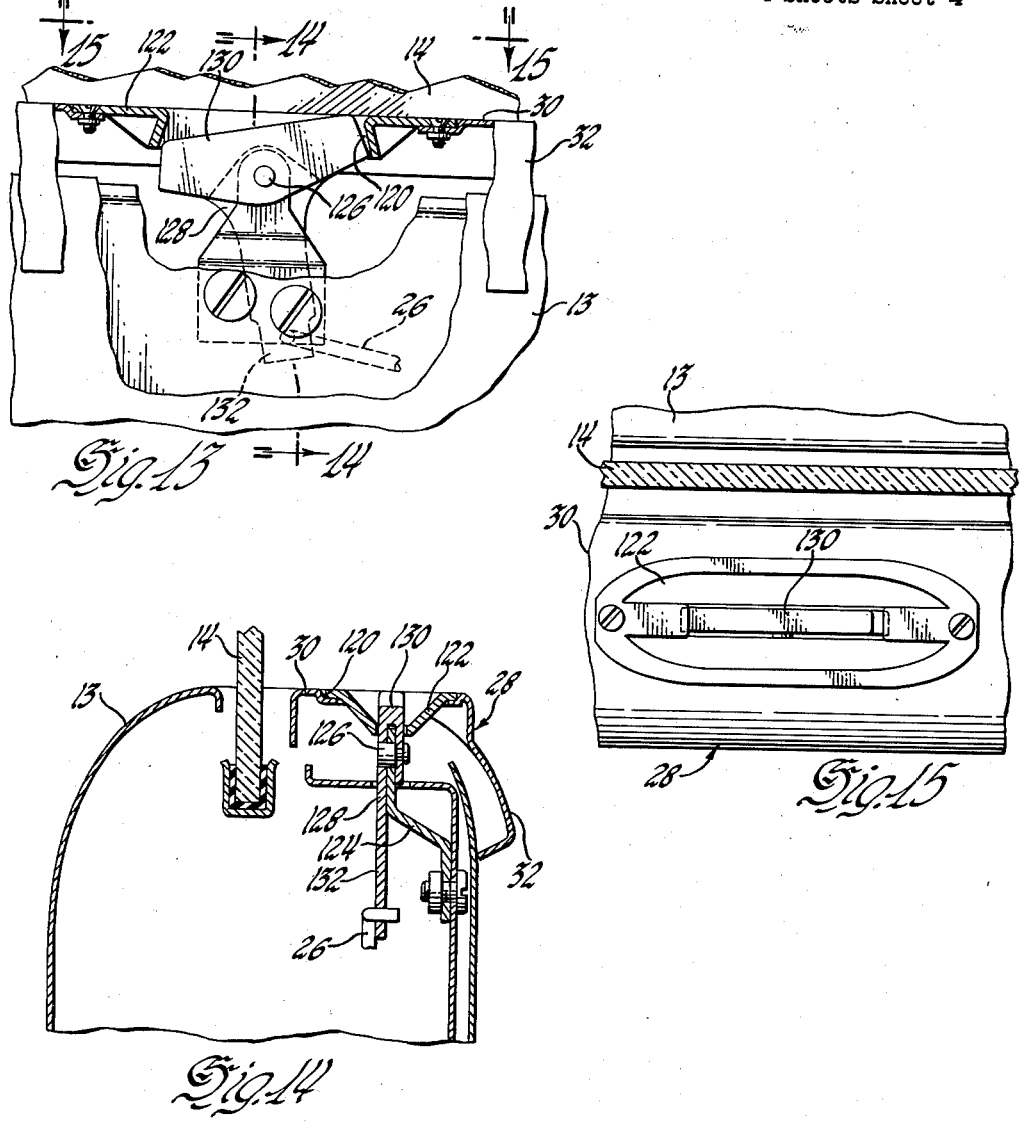

United States Patent Office 2,965,402
Patented Dec. 20, 1960

2,965,402
REMOTE LOCKING BUTTON DEVICES
Arthur W. Hollar, Jr., Grosse Pointe Woods, Mich., assignor to General Motors Corporation, Detroit, Mich., a corporation of Delaware
Filed May 12, 1958, Ser. No. 734,784
1 Claim. (Cl. 292—347)

This invention relates to remote locking button devices for automobile doors, and more particularly to improved garnish molding lock operators which do not project substantially above the garnish molding surface and which preferably move in directions generally parallel to the plane of the garnish molding surface.

One feature of the invention is that it provides improved remote locking button devices for an automobile door; another feature of the invention is that it provides garnish molding locking devices which protrude only slightly above the surface of the garnish molding; a further feature of the invention is that the locking devices preferably move between locking and unlocking positions in directions generally parallel to the plane of that portion of the surface of the garnish molding in which they are mounted; still another feature of the invention is that the locking buttons may be pivotally mounted on the door for swinging movement between locking and unlocking positions in directions generally parallel to the plane of the garnish molding surface or for rocking movement; and yet another feature of the invention is that the button may be slidably mounted for movement between locking and unlocking positions in directions generally parallel to the plane of the garnish molding surface.

Other features and advantages will be apparent from the following description and from the drawings, in which:

Fig. 1 is a fragmentary side elevation of an automobile incorporating the invention in one form, portions of a door and the body being broken away to show the inside surface of the opposite door and body wall, parts carried inside said opposite door and body wall being shown in broken lines;

Fig. 2 is an enlarged view of a portion of the door shown in Fig. 1, the center part being broken away to simplify the drawing;

Fig. 13 is a view similar to a portion of Fig. 2 showing a fifth form of the invention;

Fig. 14 is a vertical transverse section taken along the line 14—14 of Fig. 13; and Fig. 15 is a longitudinal horizontal section taken along the line 15—15 of Fig. 13.

Figure 3:
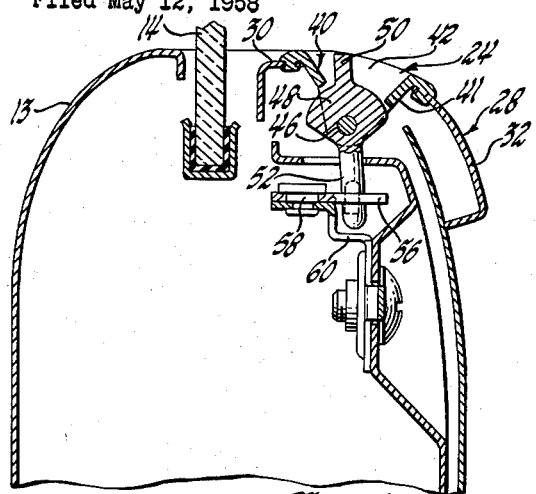
Fig. 3 is a transverse vertical section through a portion of the door taken along the line 3—3 of Fig. 2.

Most present-day automobiles have an inside locking device for each door comprising a push button that projects upwardly through the garnish molding which lies along the lower edge of the window opening on the inside of the automobile door at the belt line thereof. In the past these garnish molding locking button devices usually have comprised push buttons which move up and down, being of the type illustrated in the patent to Leslie, 2,796,276, entitled "Rotary Bolt Door Latch." Vertically movable push buttons of this type which project a considerable distance up above the surface of the garnish molding may catch on the clothing of the automobile passengers and the buttons do not lend themselves to styling modifications. This invention provides novel forms of garnish molding locking button devices in which the locking button does not project substantially above the portion of the surface of the garnish molding in which it is mounted and in which the button is movable between locking and unlocking positions in directions generally parallel to the plane of the garnish molding surface or in which the button is rockable. In accordance with the invention, the locking buttons are so constructed that they project only very little, if at all, beyond the surface of the garnish molding so that they do not present any hazard in that they cannot catch the clothes of the automobile passengers, and the buttons readily lend themselves to styling modifications.

Referring now more particularly to the drawings, Fig. 1 illustrates a portion of an automobile designated generally as 10 having a left door 12 and a right door, a portion of which is shown at 13. The upper edge of the doors forms part of the belt line of the automobile body. A vertically movable window 14 is mounted in the door 13 as is conventional and the door, which is hinged at its front edge in conventional manner (not shown), carries adjacent its rear or free swinging edge a latch designated generally as 16 with a bolt 17 adapted to engage a striker 18 mounted on the body. The latch may be of any suitable known type, and in the drawings the latch shown is generally similar to the latch of Leslie Patent 2,796,276. As described more fully in the Leslie patent, the latch has an outside operator and outside key locking means which are not shown here, and the latch also has an inside operating handle 20 mounted on the door and connected to the latch by a rod 22 and an inside locking means which will later be described in detail and which is designated generally as 24 and is connected to the latch by a rod 26. Along the upper edge of the door there is a garnish molding strip 28 having a generally horizontal surface portion 30 (see Figs. 3, 6, 7, 9, 12, 14 and 15) and a generally vertical surface portion 32.

Figure 4:
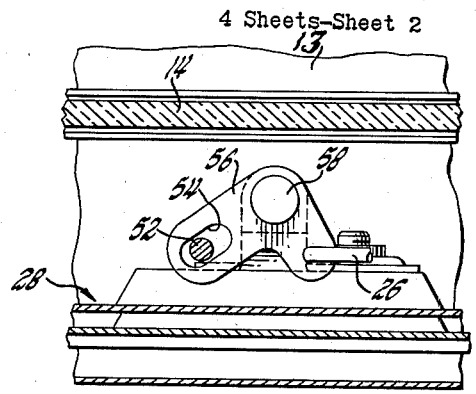
Fig. 4 is a longitudinal horizontal section taken along the line 4—4 of Fig. 2.

Figs. 2, 3 and 4 show a preferred embodiment of the invention wherein a support bracket 40 is mounted in an opening 42 (see Fig. 3) in the generally horizontal surface of the garnish molding 28. The upper portion 41 of the support bracket comprises an escutcheon and the lower portion of the bracket is formed as a yoke having spaced downwardly projecting arms 43 and 44 between which a horizontal mounting pin 46 is carried. A locking member 48 is pivoted on the pin 46 and has an upper finger-engaging portion 50 projecting into the opening 42 in the garnish molding so that it is accessible through said opening, the top end of the locking member 48 lying substantially flush with the top surface of the escutcheon 41. A lower projecting end 52 on the locking member 48 extends through a slot 54 (Fig. 4) in one arm of a bell crank 56 which is mounted for pivotal movement on a vertical stud 58 projecting from a support bracket 60 which is bolted to the door 13. The other arm of the bell crank 56 is connected to the forward end of the connecting rod 26, the rear end of which is connected to a locking lever 62 which is pivotally mounted on a stud 64 on the door latch. The locking lever 62 is movable about the axis of the stud 64 between locking and unlocking positions, carrying with it a latch release member 66. Reference may be had to Leslie Patent 2,796,276 for a full disclosure of the latch construction and operation whereby, when in locked position, the release member 66 is uncoupled from parts of the outside release apparatus of the door latch so that it merely "free wheels" upon operation of the outside handle. Since the Leslie patent includes a full description of the construction and operation of the door latch, it will not be further described here. The only difference of any consequence between the two latches is that in the Leslie patent the connecting rod from the garnish molding button is not connected directly to the locking lever but is connected to the locking lever through an intermediate lever. However, the operation is the same.

The finger-engaging portion 50 of the locking member 48 may be engaged by an operator and moved in directions generally parallel to the plane in which the opening 42 in the garnish molding surface lies to pivot the locking member 48 about the stud 46, picking up the bell crank 56, and consequently moving the locking lever in the latch 62 between its locking and unlocking positions. An over-center spring 68 connected between the locking lever 62 and the latch frame yieldably holds the locking lever in either position. Since the operating portion 50 of the locking member moves in directions generally parallel to the plane in which the opening 42 lies rather than moving transversely to this plane as in conventional structure as shown, for example, in Leslie Patent 2,796,276, the locking member need not project any appreciable distance above the horizontal surface 30 of the garnish molding and cannot catch on the clothes of the passengers in the automobile. Furthermore, a locking member of this type readily lends itself to different styling modifications as is exemplified by the different forms of locking members illustrated herein.

Figure 5:
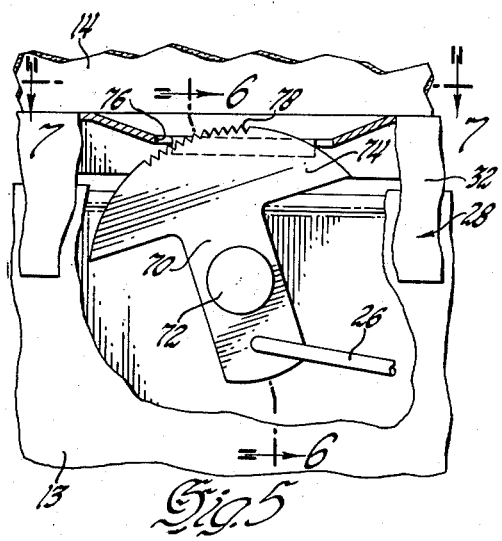
Fig. 5 is a view similar to a portion of Fig. 2 showing a second form of the invention.
Figure 6:
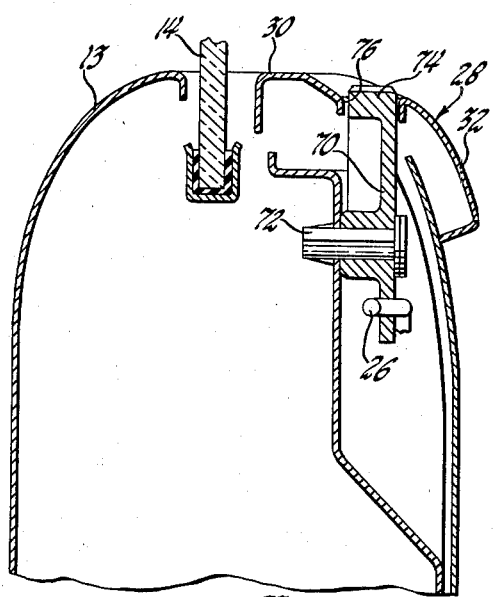
Fig. 6 is a transverse vertical section taken along the line 6—6 of Fig. 5.
Figure 7:
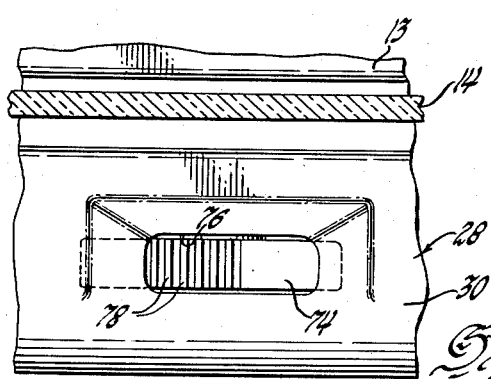
Fig. 7 is a horizontal longitudinal section taken along the line 7—7 of Fig. 5.

Figs. 5, 6 and 7 show a second form of the invention in which the locking member 70 is pivoted intermediate its ends on a horizontal stud 72 projecting from the door. The locking member 70 has an enlarged head 74 with an upper finger-engaging portion projecting into an opening 76 in the horizontal surface of the garnish molding, the center portion of this head being serrated as shown at 78 to facilitate finger operation. The locking member 70 may be swung about the stud 72 forwardly or rearwardly of the automobile body in directions generally parallel to the plane in which the opening 76 lies to shift the locking lever to which it is connected between locking and unlocking positions. As seen best in Fig. 5, the locking member 70 does not project at all above the upper surface of the garnish molding except in a small depressed area of said surface adjacent the opening 76.

Figure 8:
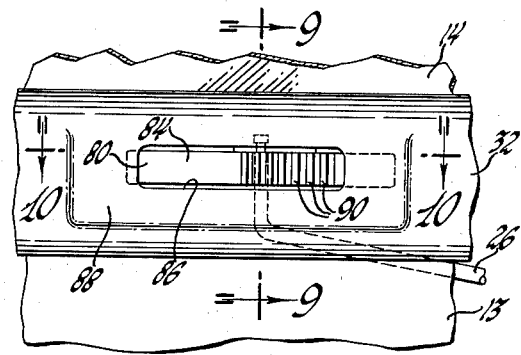
Fig. 8 is a view similar to a portion of Fig. 2 but showing a third form of the invention.
Figure 9:
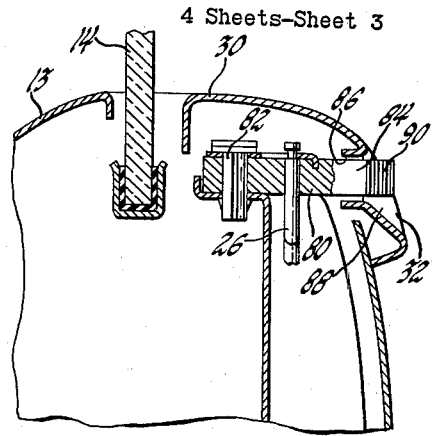
Fig. 9 is a vertical transverse section taken along the line 9—9 of Fig. 8.
Figure 10:
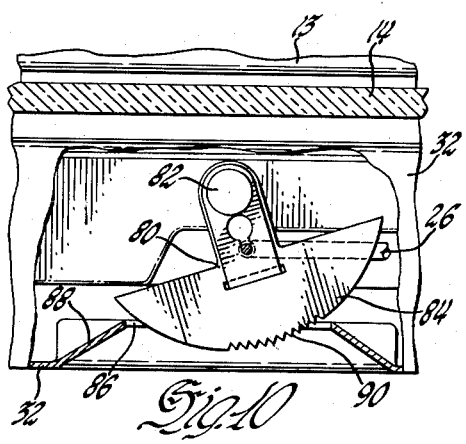
Fig. 10 is a horizontal longitudinal section taken along the line 10—10 of Fig. 8.

Figs. 8, 9 and 10 show a third form of the invention in which the structure is generally the same as illustrated in Figs. 5, 6 and 7 except that the locking member is pivoted about a vertical stud and projects through an opening in the generally vertical surface 32 of the garnish molding.

In Figs. 8, 9 and 10 a locking member 80 is pivoted on a stud 82 projecting from a bracket in the door and the locking member has an enlarged head 84 which extends into an opening 86 in a depressed portion 88 of the generally vertical wall 32 of the garnish molding. Serrations 90 on the projecting portion of the head 84 facilitate finger operation. The operation is generally the same as the modifications of Figs. 5, 6 and 7 in that the locking member 80 may be swung about the axis of the stud 82 so that the operating portion of its head swings in directions generally parallel to the plane in which the opening 86 lies between locking and unlocking positions. The locking member is connected by the rod 26 to the locking lever 62 in the door latch.

Figure 11:
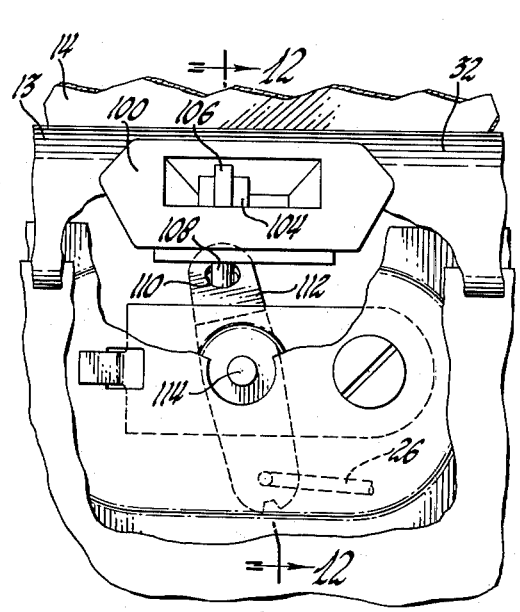
Fig. 11 is a view similar to a portion of Fig. 2 showing a fourth form of the invention.
Figure 12:
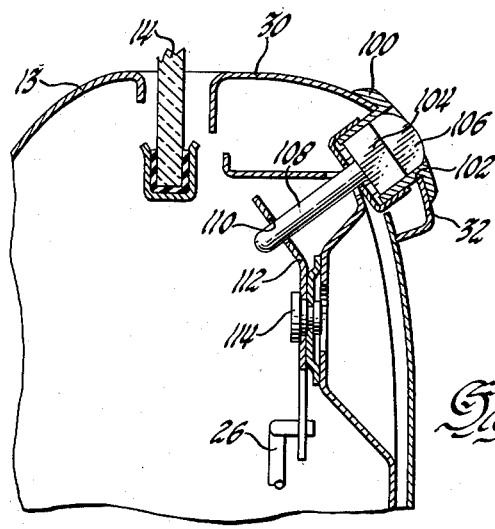
Fig. 12 is a vertical transverse section taken along the line 12—12 of Fig. 11.

Figs. 11 and 12 show a fourth form of the invention in which the locking member is slidable relative to the garnish molding in directions generally parallel to the plane of the garnish molding opening through which the locking member projects. In this embodiment of the invention there is an escutcheon 100 mounted in an opening 102 in the garnish molding and a locking member 104 is seated in the escutcheon and is slidable therein in directions forward and rearwardly of the automobile body. The slidable locking member has an upper finger-engaging portion 106 and a lower stud portion 108 which extends downwardly and outwardly through an opening 110 in a lever 112 pivoted intermediate its ends on a stud 114. The other end of the lever 112 is connected to the locking lever 62 in the door latch through the rod 26 so that when the locking member is moved between its locking and unlocking positions, it carries with it the locking lever 62. Again, the locking lever is moved in directions generally parallel to the plane in which the opening in the garnish molding lies.

Figs. 13, 14 and 15 illustrate a fifth form of the invention in which the locking member is rockable, being mounted intermediate its ends in an opening in the garnish molding so that either end may project up into the opening for engagement by a finger of the operator. In this form of the invention the horizontal suface 30 of the garnish molding button is formed with an opening 120 in which an escutcheon 122 is mounted. A support bracket 124 projecting upwardly from a panel of the door carries a horizontal pin 126 upon which a locking member 128 is rockably mounted. The locking member has an upper finger-engaging portion 130 which projects up into the opening in the garnish molding and which is so arranged that one end or the other is always adapted to be finger operated to pivot the locking member about the stud 126. A downwardly extending projection 132 on the locking member is connected to the rod 26 which in turn is connected to the locking lever 62 in the door latch so that upon rocking movement of the member 130 between locking and unlocking positions, the locking lever 62 similarly is moved between locking and unlocking positions.

While I have shown and described several embodiments of my invention, it is capable of many modifications. Changes, therefore, in the construction and arrangement may be made without departing from the spirit and scope of the invention as set forth in the appended claim.

I claim:

In a vehicle door having a latch disposed at the jamb portion thereof and having a garnish molding with a generally horizontal surface extending in directions longitudinally of the door, said surface having an opening therein, a locking member having a finger-engaging portion in said opening and a projecting end beneath said opening, a support bracket having an upper portion in said opening and a lower portion beneath said opening, said upper portion comprising an escutcheon, said lower portion comprising a pair of spaced arms, a shaft extending longitudinally of the door and having its axis parallel to said horizontal surface, said shaft being mounted between said arms, said locking member being pivotally carrier by said shaft and having said finger-engaging portion extending into said upper portion of said support bracket and terminating substantially flush with said escutcheon, a bell crank having first and second arms and pivotally mounted on said door on a vertical axis, the first arm of said bell crank having an elongated slot for accommodating said projecting end of said locking member, a rod connected to said second arm and to a locking lever, said rod adapted to move said locking lever between locked and unlocked positions when said locking member is pivoted on said shaft.

References Cited in the file of this patent

UNITED STATES PATENTS

| | | |
|---|---|---|
| 2,494,672 | Schofield | Jan. 17, 1950 |
| 2,710,213 | Hottel | June 7, 1955 |
| 2,796,276 | Leslie | June 18, 1957 |